US010309452B2

(12) United States Patent
Mueller

(10) Patent No.: US 10,309,452 B2
(45) Date of Patent: Jun. 4, 2019

(54) CYLINDRICAL BEARING WITH THERMALLY CONDUCTIVE MEMBERS

(71) Applicant: Thomas G. Mueller, Elk Grove Village, IL (US)

(72) Inventor: Thomas G. Mueller, Elk Grove Village, IL (US)

(73) Assignee: AKTIEBOLAGET SKF, Gothenburg (SE)

( * ) Notice: Subject to any disclaimer, the term of this patent is extended or adjusted under 35 U.S.C. 154(b) by 374 days.

(21) Appl. No.: 14/502,037

(22) Filed: Sep. 30, 2014

(65) Prior Publication Data

US 2016/0091017 A1 Mar. 31, 2016

(51) Int. Cl.
| | |
|---|---|
| *F16F 1/387* | (2006.01) |
| *F16F 1/40* | (2006.01) |
| *F16C 17/22* | (2006.01) |
| *F16C 27/06* | (2006.01) |
| *B64C 27/32* | (2006.01) |
| *F16F 1/393* | (2006.01) |

(52) U.S. Cl.
CPC .............. *F16C 17/22* (2013.01); *B64C 27/32* (2013.01); *F16C 27/063* (2013.01); *F16F 1/3876* (2013.01); *F16F 1/393* (2013.01)

(58) Field of Classification Search
CPC ........ F16C 11/22; F16C 17/22; F16C 27/063; B64C 27/35; B60G 11/22; F16F 1/40
USPC .............................................. 267/141.1, 294
See application file for complete search history.

(56) References Cited

U.S. PATENT DOCUMENTS

| | | | | | |
|---|---|---|---|---|---|
| 4,105,266 | A | * | 8/1978 | Finney .................... | F16F 1/403 267/152 |
| 4,256,354 | A | * | 3/1981 | Peterson ............... | F16F 1/3935 384/2 |
| 4,286,827 | A | * | 9/1981 | Peterson ............... | F16C 27/063 267/141.1 |
| 4,357,057 | A | * | 11/1982 | Peterson ................. | B64C 27/35 384/125 |
| 4,435,097 | A | * | 3/1984 | Peterson ................. | B64C 27/35 384/221 |
| 4,729,753 | A | * | 3/1988 | Neathery ................ | B64C 27/35 416/102 |
| 4,804,352 | A | * | 2/1989 | Schmidt .................. | B64C 27/41 384/221 |
| 4,886,419 | A | * | 12/1989 | McCafferty ............. | B64C 27/35 416/134 A |
| 4,895,354 | A | * | 1/1990 | Byrnes ..................... | F16F 1/41 267/140.5 |

(Continued)

Primary Examiner — Bradley T King
Assistant Examiner — James K Hsiao
(74) Attorney, Agent, or Firm — Mark Ussai; SKF USA Inc. Patent Dept.

(57) ABSTRACT

A bearing assembly is for supporting a pivotable member and includes a laminated bearing having a generally cylindrical body with a centerline and a central bore for receiving at least a portion of the pivotable member. The body is formed of a plurality of alternating, generally tubular elastomeric and metallic laminae nested coaxially about the central axis, each one of the elastomeric and metallic laminae having opposing axial ends. At least one and preferably two thermally conductive members are coupled with a separate one of the two axial ends of one of the metallic laminae and each extends generally axially from the bearing body so as to provide a heat sink.

13 Claims, 10 Drawing Sheets

(56) References Cited

U.S. PATENT DOCUMENTS

| | | | | |
|---|---|---|---|---|
| 4,986,735 A * | 1/1991 | Robinson | F16F 1/393 | 416/134 A |
| 5,092,738 A * | 3/1992 | Byrnes | B64C 27/51 | 416/134 A |
| 5,186,686 A * | 2/1993 | Staples | B64C 27/35 | 464/69 |
| 5,188,513 A * | 2/1993 | Byrnes | F16F 3/093 | 267/140.4 |
| 5,449,152 A * | 9/1995 | Byrnes | B64C 27/51 | 267/141.1 |
| 5,497,960 A * | 3/1996 | Previnaire | B64C 27/001 | 244/118.1 |
| 5,601,408 A * | 2/1997 | Hunter | B64C 27/35 | 267/141.1 |
| 5,913,659 A * | 6/1999 | Doolin | B64C 27/008 | 267/141.4 |
| 5,988,610 A * | 11/1999 | Hiraki | F16F 1/38 | 267/140.13 |
| 6,045,328 A * | 4/2000 | Jones | F16F 13/105 | 248/562 |
| 6,113,352 A * | 9/2000 | Certain | B64C 27/33 | 416/104 |
| 6,189,874 B1 * | 2/2001 | Carlson | F16F 1/3842 | 248/638 |
| 6,325,687 B1 * | 12/2001 | Ungerbuehler | B63H 23/326 | 403/312 |
| 6,695,583 B2 * | 2/2004 | Schmaling | B64C 27/35 | 267/141.1 |
| 7,354,248 B2 * | 4/2008 | Zinni | B64C 27/322 | 267/141 |
| 7,896,747 B2 * | 3/2011 | Russell | F16C 7/04 | 464/70 |
| 8,632,062 B2 * | 1/2014 | James | B64C 27/35 | 267/140.2 |
| 9,260,185 B2 * | 2/2016 | Covington | B64C 27/51 | |
| 9,499,022 B2 * | 11/2016 | Pei | B60G 11/22 | |
| 2004/0113338 A1 * | 6/2004 | Wietharn | B60G 11/22 | 267/141.1 |
| 2006/0027957 A1 * | 2/2006 | Mueller | B64C 27/35 | 267/273 |
| 2009/0224448 A1 * | 9/2009 | Rodecker | F16F 1/50 | 267/141.1 |
| 2009/0232186 A1 * | 9/2009 | Li | G01K 1/143 | 374/208 |
| 2011/0255813 A1 * | 10/2011 | Mol | F16C 19/522 | 384/448 |
| 2013/0048127 A1 * | 2/2013 | Bosworth | F16F 9/52 | 138/31 |
| 2013/0189098 A1 * | 7/2013 | Covington | B64C 27/51 | 416/1 |
| 2014/0017085 A1 * | 1/2014 | Amari | B64C 27/51 | 416/95 |
| 2014/0205364 A1 * | 7/2014 | Bouwer | F16F 1/40 | 403/120 |
| 2014/0355644 A1 * | 12/2014 | Gupta | G01K 7/38 | 374/4 |
| 2015/0225076 A1 * | 8/2015 | Lawrence | B64C 27/06 | 415/81 |

\* cited by examiner

US 10,309,452 B2

CYLINDRICAL BEARING WITH THERMALLY CONDUCTIVE MEMBERS

BACKGROUND OF THE INVENTION

The present invention relates to bearings, and more particularly to laminated elastomeric bearings used in applications such as helicopter rotors.

Laminated elastomeric bearings are known and include a plurality of alternating, nested elastomeric and metallic layers disposed coaxially about a centerline. Such bearings permit movement of a component, such as a centering pin of a feathering hinge, to pivot or "twist" about the bearing centerline and/or to pivot partially about one or more axes generally perpendicular to the centerline. Such bearings are effective in applications such as the feathering hinge of a rotor assembly, but may experience premature failure due to temperature-induced breakdown of the elastomeric layers in certain sections of the bearing which experience relatively greater amounts of strain.

SUMMARY OF THE INVENTION

In one aspect, the present invention is a bearing assembly for supporting a pivotable member, the bearing assembly comprising a laminated bearing including a generally cylindrical body having a centerline and a central bore for receiving at least a portion of the pivotable member. The body is formed of a plurality of alternating, generally tubular elastomeric and metallic laminae nested coaxially about the central axis, each one of the elastomeric and metallic laminae having opposing axial ends. At least one thermally conductive member is coupled with one of the two axial ends of one of the metallic laminae and extends generally axially from the bearing body so as to provide a heat sink.

In another aspect, the present invention is again a bearing assembly for supporting a pivotable member. The bearing assembly comprises a laminated bearing including a generally cylindrical body having a central bore and being formed of a plurality of alternating, generally tubular elastomeric and metallic laminae nested coaxially about the central axis, each one of the elastomeric and metallic laminae having opposing axial ends. The plurality of metallic laminae includes an inner set of substantially circular cylindrical laminae, an outer set of partially spherical laminae disposed about the inner set of cylindrical metallic laminae, and a transition metallic lamina disposed between the inner set of laminae and the outer set of laminae. The transition lamina has a substantially circular cylindrical inner circumferential surface and an at least partially spherical outer circumferential surface. Further, at least one thermally conductive member is coupled with one of the two axial ends of the transition lamina and extends generally axially from the bearing body so as to provide a heat sink.

In a further aspect, the present invention is a feathering hinge for a rotor assembly, the rotor assembly including at least one blade. The hinge assembly comprises a generally cylindrical centering pin coupleable with the at least one rotor blade. A laminated bearing including a generally cylindrical body has a centerline and a central bore for receiving at least a portion of the pin, the body being formed of a plurality of alternating, generally tubular elastomeric and metallic laminae nested coaxially about the central axis, each one of the elastomeric and metallic laminae having opposing axial ends. At least one thermally conductive member is coupled with one of the two axial ends of one of the metallic laminae and extends generally axially from the bearing body so as to provide a heat sink.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings.

DETAILED DESCRIPTION OF THE INVENTION

Certain terminology is used in the following description for convenience only and is not limiting. The words "inner", "inwardly" and "outer", "outwardly" refer to directions toward and away from, respectively, a designated centerline or a geometric center of an element being described, the particular meaning being readily apparent from the context of the description. Also, as used herein, the words "connected" or "coupled" are each intended to include integrally formed members, direct connections between two distinct members without any other members interposed therebetween and indirect connections between members in which one or more other members are interposed therebetween. The terminology includes the words specifically mentioned above, derivatives thereof, and words of similar import.

Figure 1:
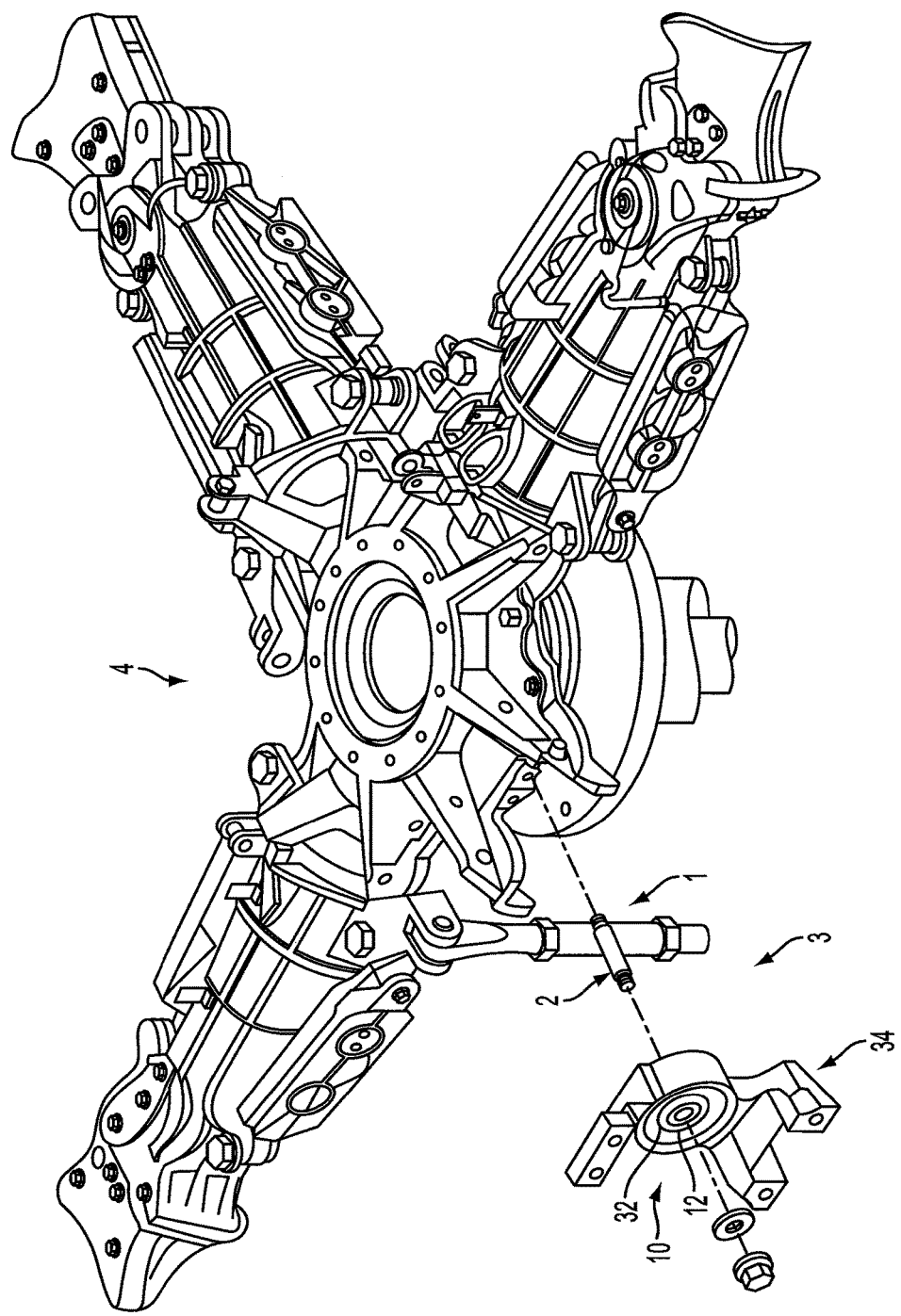
FIG. 1 is a partly exploded view of an exemplary rotor assembly, showing a bearing assembly in accordance with the present invention.
Figure 2:
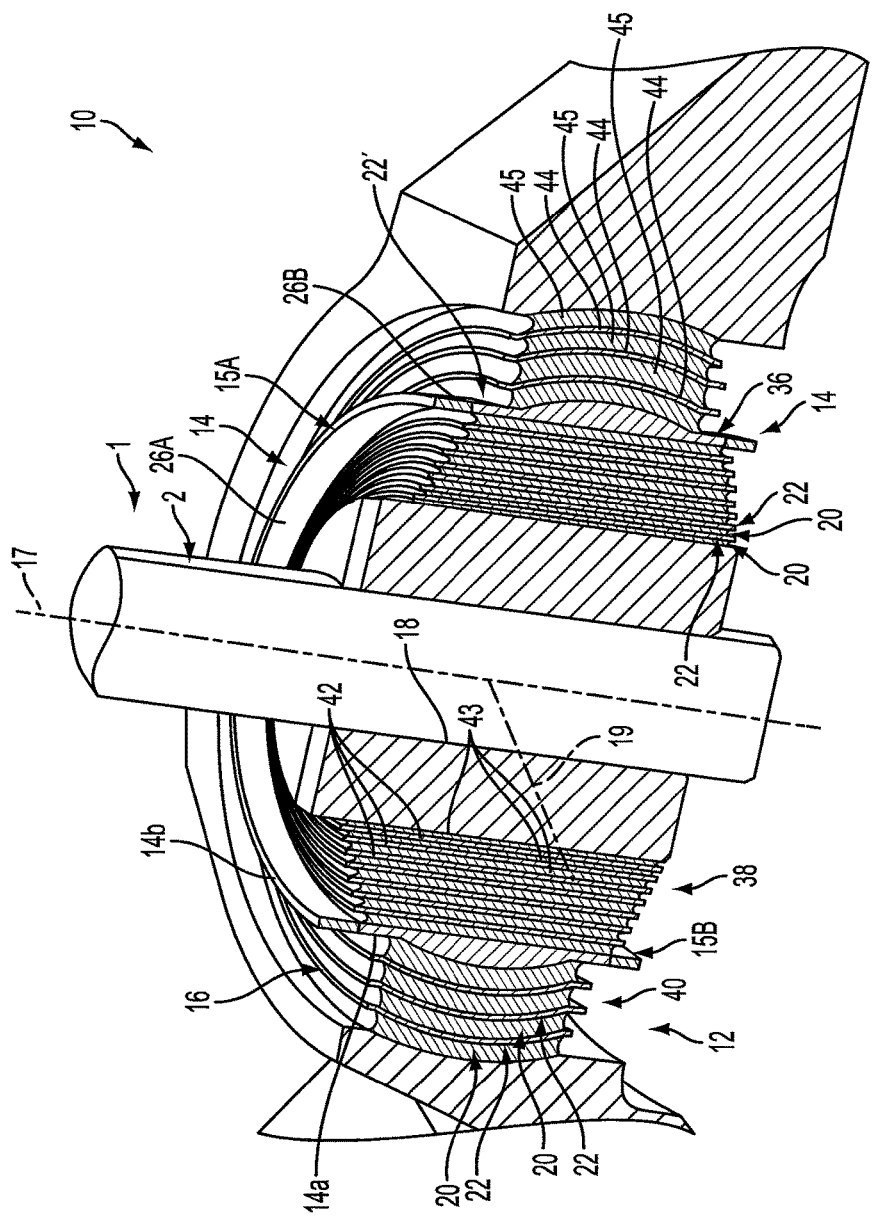
FIG. 2 is a partly broken-away, axial cross-section in perspective of the bearing assembly, showing a centering pin and indicating two pivot axes.
Figure 3:
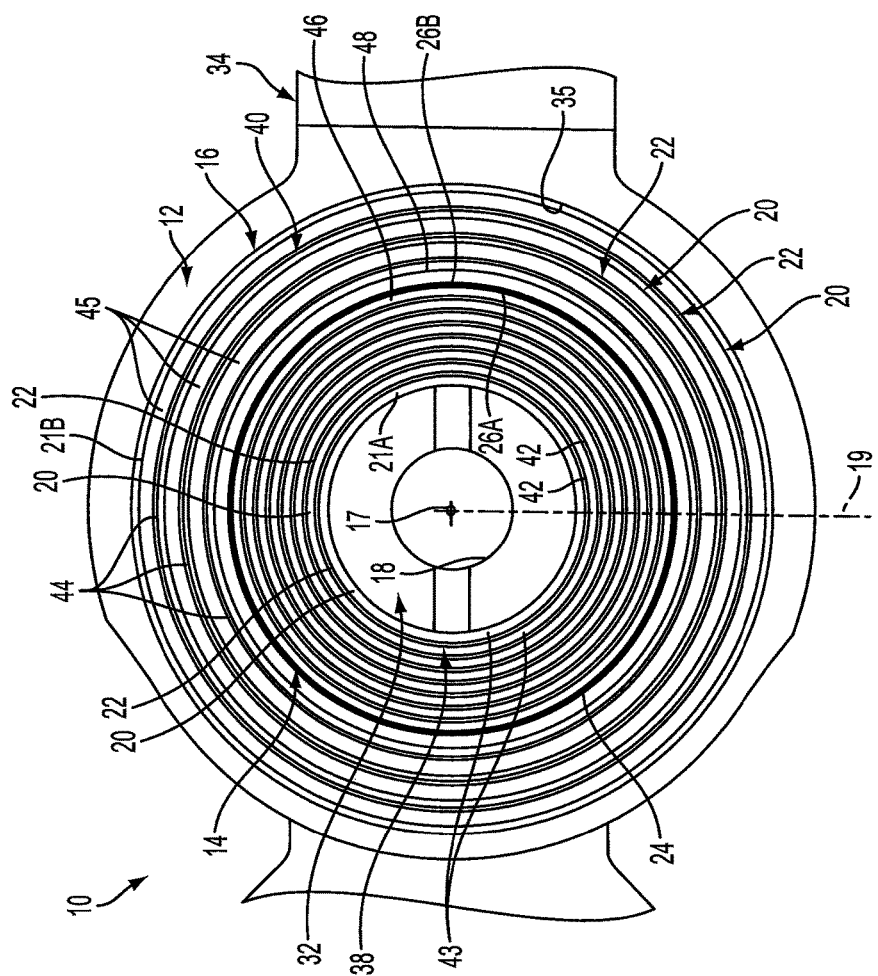
FIG. 3 is a top plan view of the bearing assembly, showing a continuous cylindrical conductive member.
Figure 4:
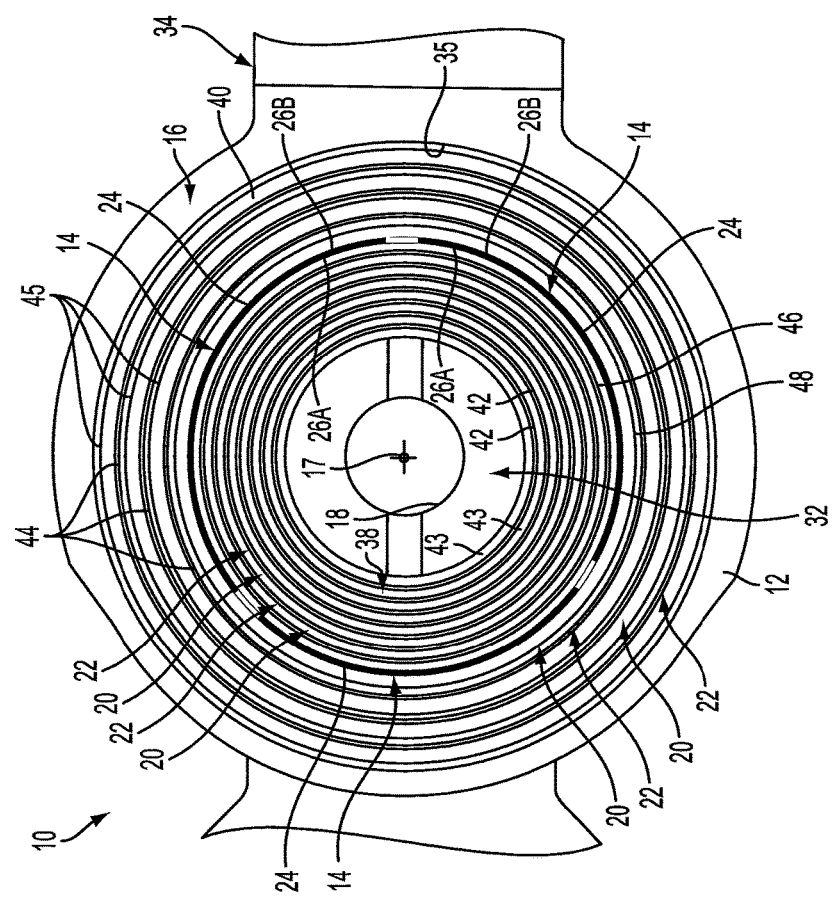
FIG. 4 is another top plan view of the bearing assembly, showing a plurality of arcuate conductive members.

Referring now to the drawings in detail, wherein like numbers are used to indicate like elements throughout, there is shown in FIGS. 1-10 a bearing assembly 10 for supporting a pivotable member 1, which is preferably a centering pin 2 of a feathering hinge 3 incorporated into a rotor assembly 4, as shown in FIG. 1. The bearing assembly 10 basically comprises a laminated elastomeric bearing 12 and at least one thermally conductive member 14 coupled with the bearing 12. The bearing 12 includes a generally cylindrical body 16 having a centerline 17 and a central bore 18 for receiving at least a portion of the pivotable member 1. The body 16 is formed of a plurality of alternating, generally tubular elastomeric and metallic laminae 20, 22, respectively, nested coaxially about the centerline 17. That is, except for an innermost and an outermost elastomeric layer or lamina 20 as discussed below, each tubular or cylindrical elastomeric lamina 20 and each tubular/cylindrical metallic lamina 22 is disposed or "sandwiched" between two lamina of the other material, i.e., each metallic lamina 22 is disposed between two elastomeric lamina 20, and vice-versa.

Figure 9:
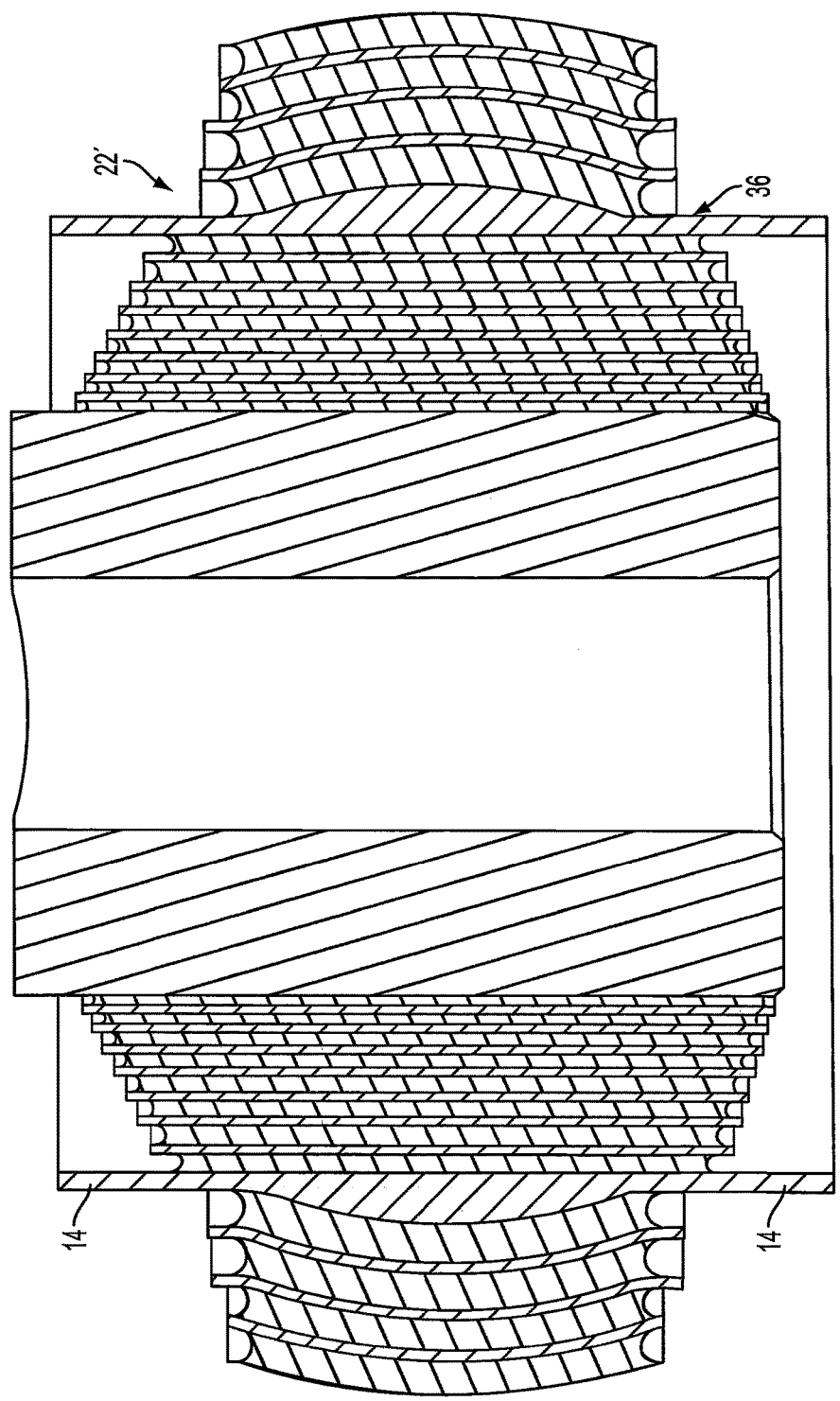
FIG. 9 is an axial cross-sectional view of a laminated elastomeric bearing having two conductive members integrally formed with a metallic lamina.

Further, each one of the elastomeric laminae 20 and the metallic laminae 22 has opposing axial ends 20a, 20b and 22a, 22b, respectively, the metallic laminae 22 having an axial length $L_M$ between the ends 22a, 22b, as discussed below. Further, the at least one thermally conductive member 14 is coupled with one of the two axial ends 22a, 22b of one of the metallic laminae 22, indicated as lamina 22' hereafter, and extends generally axially (i.e., generally along the centerline 17) from the bearing body 16 so as to provide a heat sink. The conductive member 14 is preferably a separate member or body 24 that is attached to the "coupled" metallic lamina 22' to facilitate assembly, as discussed in further detail below, but may alternatively be an integrally formed extension of the particular lamina 22', as depicted in FIG. 9. More specifically, each conductive member body 24 is preferably either generally circular cylindrical (FIGS. 2, 3, 5 and 6) or generally arcuate (FIG. 4), but may have any other appropriate shape and/or may include radially or/and axially extending fins or other extensions to increase the heat transfer rate (none depicted). Preferably, each of the one or more bodies 24 is formed of a metallic material, for example aluminum, but may alternatively be fabricated of any other sufficiently thermally conductive material, such as for example, graphene or a composite polymer (e.g., Polyaniline, Polypyrrole, etc.).

Figure 5:
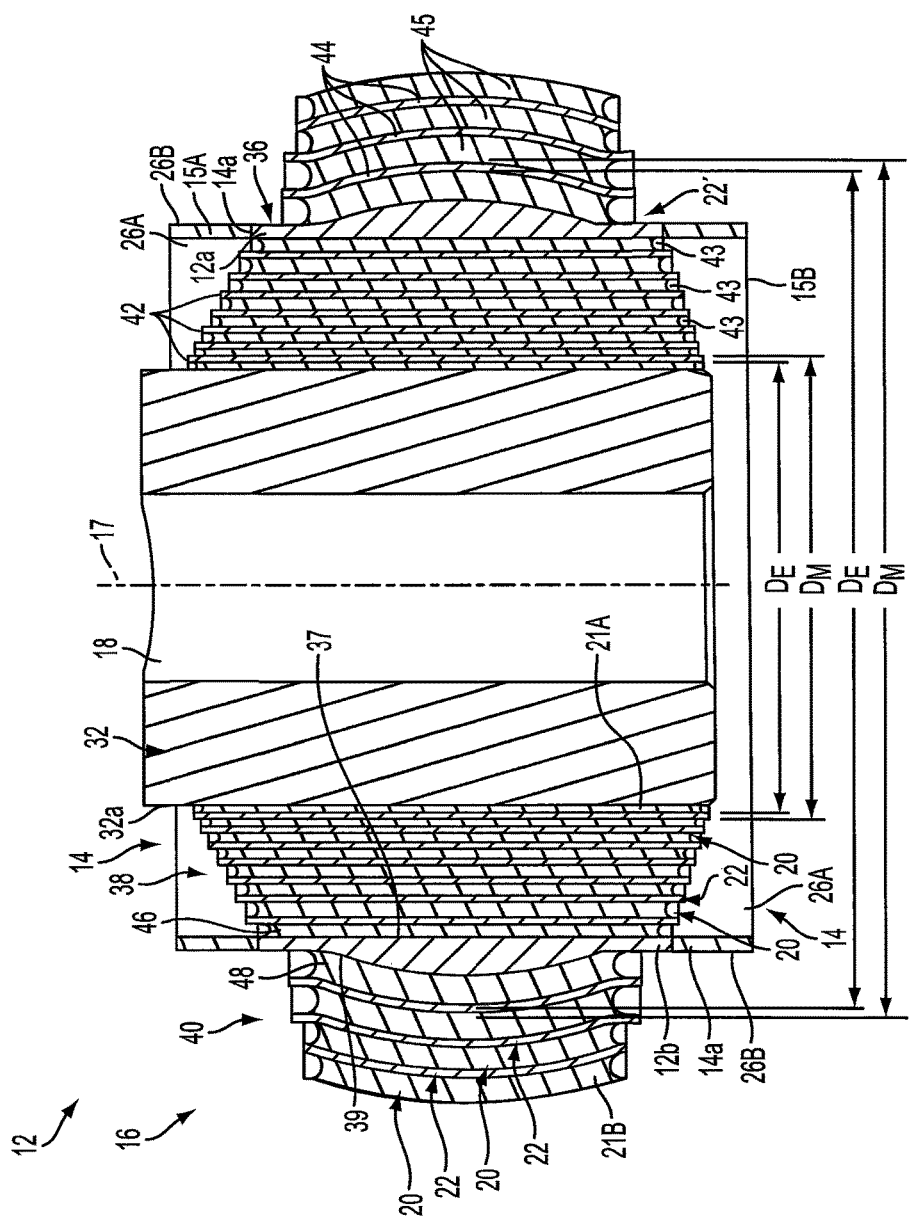
FIG. 5 is an axial cross-sectional view of a laminated elastomeric bearing having two thermally conductive members.
Figure 6:
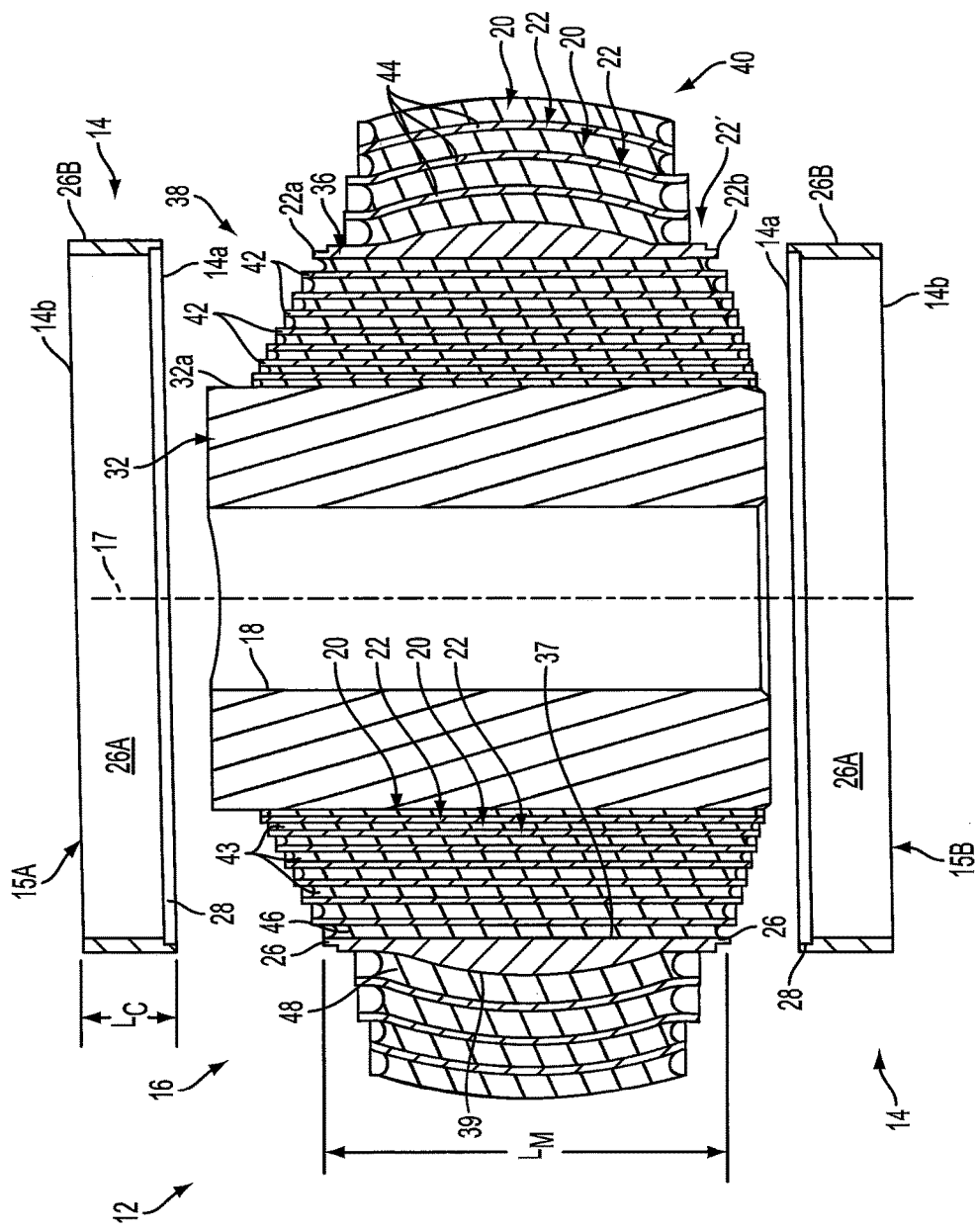
FIG. 6 is a partly exploded view of FIG. 5, showing the two conductive members spaced from the bearing body.
Figure 7:
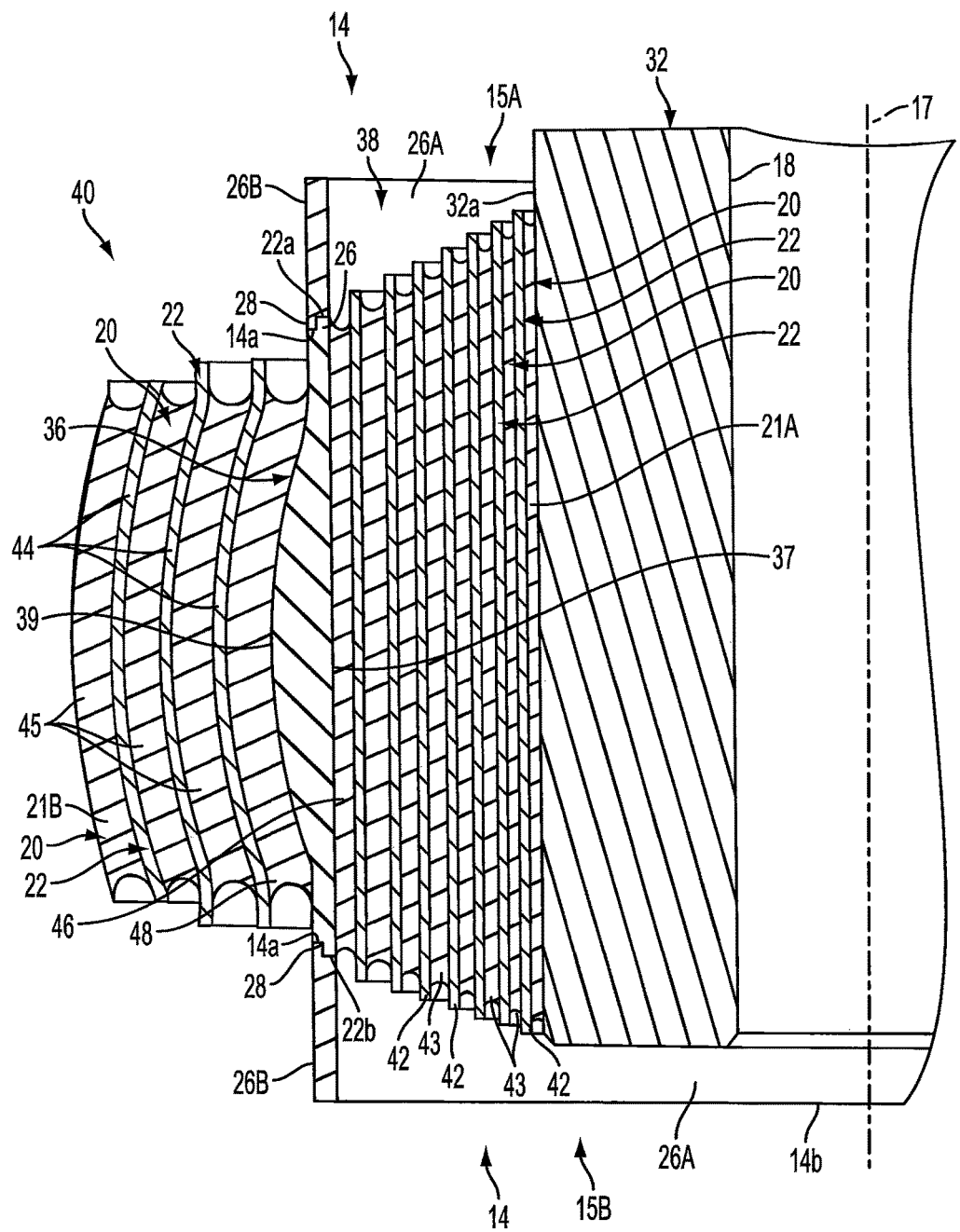
FIG. 7 is an enlarged, broken-away view of a portion of FIG. 5, showing complementary mating shoulders of a metallic lamina and a conductive member.
Figure 8:
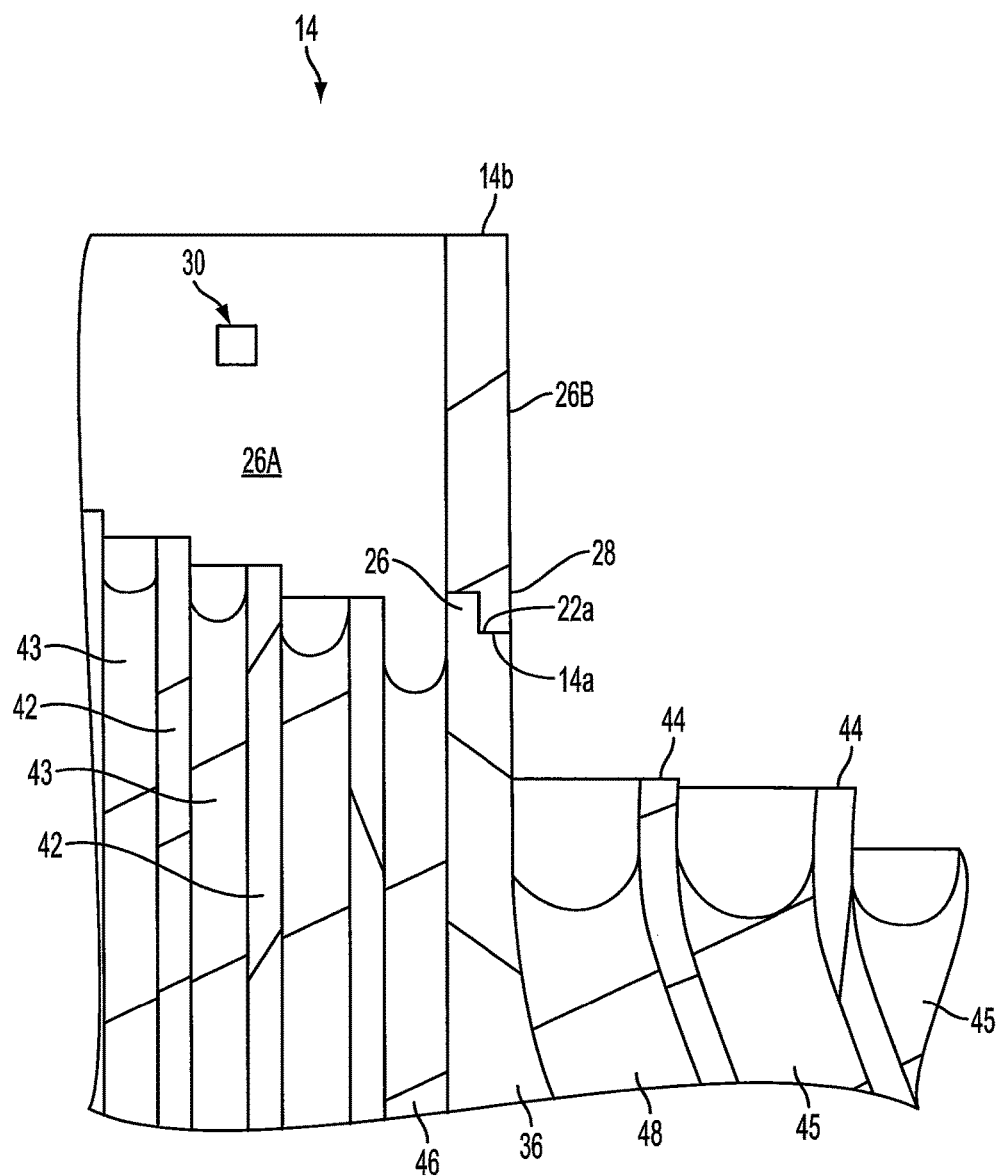
FIG. 8 is a greatly enlarged, broken-away view of a portion of FIG. 5, showing a sensor mounted to a conductive member.

Furthermore, each conductive member 14 has an inner axial end 14a attached to the one metallic lamina 22' and an opposing, outer axial end 14b spaced axially from the bearing body 16. As indicated in FIG. 6, the conductive member(s) 14 each preferably have an axial length $L_C$ between the two ends 14a, 14b that is at least about ten percent (10%) of the axial length $L_M$ of the coupled metallic lamina 22', and most preferably between about ten percent (10%) and fifty percent (50%) of the axial length $L_M$. As such, each conductive member 14 has a sufficiently large surface area to enable a desired rate of convective heat transfer, as discussed in further detail below Referring to FIGS. 6-8, the inner axial end 14a of the conductive member 14 is attached to the one metallic lamina 22 by any appropriate means, such as for example, a press-fit, threading, welding, brazing, adhesive, rivets, threaded fasteners, etc. Most preferably, the one metallic lamina 22' has a generally circular cylindrical shoulder 26 extending axially from the one axial end 22a or 22b and the conductive member 14 has a complementary, generally circular cylindrical shoulder 28 extending axially from the inner axial end 14a. The conductive member shoulder 28 is juxtaposeable against the shoulder 26 of the one coupled metallic lamina 22', the conductive member shoulder 28 being disposed either radially inwardly of, or radially outwardly from, the metallic lamina shoulder 26, as best shown in FIG. 8. With this preferred structure, the complementary shoulders 14 are coupled to connect the conductive member 14 with the one metallic lamina 22, either by complementary threading on the shoulders 14, press-fit established between the shoulders 26, 28 welding or brazing the shoulders 26, 28 together, or attaching the shoulders 26, 28 by rivets, threaded fasteners, or any other appropriate means. However, the each conductive member 14 and the coupled metallic lamina 22' may be formed without any shoulders and may instead be joined together by abutting the conductive member inner ends 14a with the metallic lamina ends 12a or 12b, as shown in FIG. 5, or by radially overlapping the conductive member(s) 14 and the coupled lamina 22' (not shown).

Referring to FIGS. 2-8, each conductive member 14 has opposing inner and outer circumferential surfaces 26A, 26B extending at least partially about the body centerline 17. Each circumferential surface 26A, 26B is exposed to ambient air (i.e., about the bearing body 16) to enable convective heat transfer from the conductive member 14. As such, heat within the coupled metallic lamina 22' flows by conduction into the conductive member 14 and is thereafter transferred from the member 14 by convection. Thereby, the temperature within the one metallic lamina 22', and the two radially-adjacent elastomeric laminae 20, is reduced, which helps prevent thermal degradation of these elastomeric laminae 20.

Referring now to FIGS. 2 and 5-7, the bearing assembly 10 preferably includes at least two conductive members 14 coupled with the metallic lamina 22'. Specifically, at least one first conductive member 15A is coupled with a first axial end 22a of the one metallic lamina 22' and at least one second conductive member 15B is coupled with a second axial end 22b of the metallic lamina 22'. By having conductive members 14 at each axial end 22a, 22b of the metallic lamina 22', heat is more efficiently transferred from the metallic lamina 22', and thus also from the two adjacent elastomeric laminae 20. Further, although depicted as having only first and second conductive members 15A, 15B attached to a single metallic lamina 22', the bearing assembly 10 may have one or more conductive members 14 attached to each one of any desired number of metallic lamina 22, depending on the operating characteristics or environment of the laminated bearing 12.

Referring particularly to FIG. 8, the bearing assembly 10 may further comprise at least one sensor 30 mounted to the conductive member 14. Preferably, the sensor 30 is configured to determine at least temperature of the conductive member 14, thereby providing an indication of the temperature of the coupled metallic lamina 22' and the two adjacent elastomeric laminae 20. However, the sensor 30 may be configured to determine any other physical parameter, such as for example vibration, acceleration, proximity, strain, or environmental characteristics. Referring now to FIGS. 2-7, the laminated bearing 12 is preferably formed as any one the numerous known conventional laminated elastomeric bearing designs. As such, the plurality of elastomeric laminae 20 and metallic laminae 22 of the bearing body 16 are arranged with each metallic lamina 22 being disposed between two radially adjacent elastomeric laminae 20 in a coaxial arrangement, and vice-versa for the majority of the elastomeric lamina 20. Also, each one of the elastomeric and metallic laminae 20, 22 has an outside diameter $D_E$, $D_M$, respectively, and the plurality of laminae 20, 22 is arranged such that each one of the laminae 20, 22 is disposed within all of the other laminae 20, 22 having an outside diameter $D_E$, $D_M$ greater than the outside diameter $D_E$ or $D_M$ of the one lamina 20 or 22, as indicated for four randomly selected lamina 20, 22 in FIG. 5. In other words, each lamina 20, 22, except for an innermost elastomeric lamina 20A and an outermost elastomeric lamina 20B, surrounds all diametrically smaller lamina 20, 22 and is surrounded by all diametrically larger lamina 20, 22.

Further, each elastomeric lamina 20 is either formed as a generally continuous, substantially tubular material layer, particularly the inner cylindrical lamina 43 as discussed in detail below, or may be formed as a cylinder cut into one or more sections to facilitate assembly, particularly with the outer partially spherical laminae 44 described below. Also, each one of the metallic laminae 22 includes either a continuous, generally circular cylindrical shell 23 (see FIG. 3) or a plurality of separate arcuate shells (not shown) spaced circumferentially about the bearing centerline 17. Preferably, the bearing assembly 10 further comprises a generally cylindrical collar 32 disposed within the elastomeric and metallic laminae 20, 22 and a housing 32 configured to at least partially contain the bearing body 16. The collar 32 has a central passage providing the bearing bore 18 for receiving the pivotable member 1, preferably the centering pin 2, the innermost elastomeric lamina 21A being bonded to the collar outer surface 32a to connect the collar 32 with the remainder of the bearing body 16. Furthermore, the housing 34 has a bore 35, the bearing body 16 being disposed within the housing bore 35 and an outermost elastomeric lamina 21B is preferably bonded with the inner circumferential surface of the housing bore 35. The housing 34 is preferably configured to connect the bearing assembly 10 to the rotor assembly 4 and provides a component of the feathering hinge 3.

As the laminated bearing structure discussed above is known in the bearing art, a further detailed description of the bearing body 16 is unnecessary and beyond the scope of the present disclosure, except for the following details of the presently preferred application. Preferably, the conductive members 14 are utilized with a laminated bearing body 16 that includes a "transition" metallic lamina or "shim" 36 between inner and outer subassemblies 38, 40 of the body 16, the shim 36 thus providing the "one" coupled metallic lamina 22' as described above. Specifically, the plurality of metallic laminae 22 includes an inner set of substantially circular cylindrical laminae 42, an outer set of partially spherical laminae 44 disposed about the inner set of cylindrical metallic laminae 42, and the transition lamina 36, which is disposed between the inner and outer sets of metallic laminae 42, 44 respectively.

Each elastomeric lamina 20 is bonded, preferably by vulcanization, to at least one radially adjacent metallic lamina 22, i.e., located radially inward and/or radially outward of the lamina 20, such that the elastomeric laminae 20 each take the shape of the adjacent metallic lamina 22. As such, an inner set of circular cylindrical elastomeric lamina 43 is bonded to the inner set of metallic laminae 42 to form the bearing inner subassembly 38. Likewise, an outer set of partially spherical elastomeric lamina 45 is bonded to the outer set of metallic laminae 44 to form the bearing outer subassembly 40. Further, the transition lamina 36 preferably has a substantially circular-cylindrical inner circumferential surface 37, which correlates with the inner metallic laminae 42, and an at least partially spherical outer circumferential surface 39 that fits in a complementary manner within the outer spherical metallic laminae 44. An outermost cylindrical elastomeric lamina 46 of the inner subassembly 38 is bonded to the inner surface 37 of the transition shim 36 and an innermost partially-spherical elastomeric lamina 48 of the outer subassembly 40 is bonded to the outer surface 39 of the transition shim 36, thereby coupling the inner and outer subassemblies 38, 40.

With this structure, the bearing body 16 is configured to permit angular displacement of the pivotable member 1 about the bearing centerline 17, primarily by torsional strain of the inner cylindrical elastomeric lamina 43 of the inner subassembly 38. The bearing body 16 is also configured to permit angular displacement of the pivotable member 1 about at least one and preferably a plurality of axes 19 (one exemplary axis shown for purposes of illustration only) perpendicular to the bearing centerline 17, due mainly to bending strain of the outer partially spherical elastomeric lamina 45 of the outer subassembly 40. As a result of being located within the transition region between the two subassemblies 38, 40, the two elastomeric laminae 46, 48 bonded to the transition shim 36 experience relatively greater amounts of strain as compared to the other elastomeric laminae 20, which leads to an increased temperature within the two laminae 46, 48 and the attached transition shim 36.

To reduce this temperature, the at least one conductive member 14, and preferably at least first and second conductive members 15A, 15B, are each coupled with the ends 22a, 22b of the transition lamina 36 so to provide a means to transfer heat from the transition lamina/shim 36, and thus from the adjacent elastomeric laminae 46, 48. However, the bearing assembly 10 may include additional conductive members 14 coupled with any other metallic lamina 22 in addition to, or instead of, the transition lamina/shim 36. Further, any desired number of conductive members 14 may be utilized with any laminated bearing body structure besides the preferred body 12 that includes inner and outer subassemblies 34, 36 and the transition shim 36.

Figure 10:
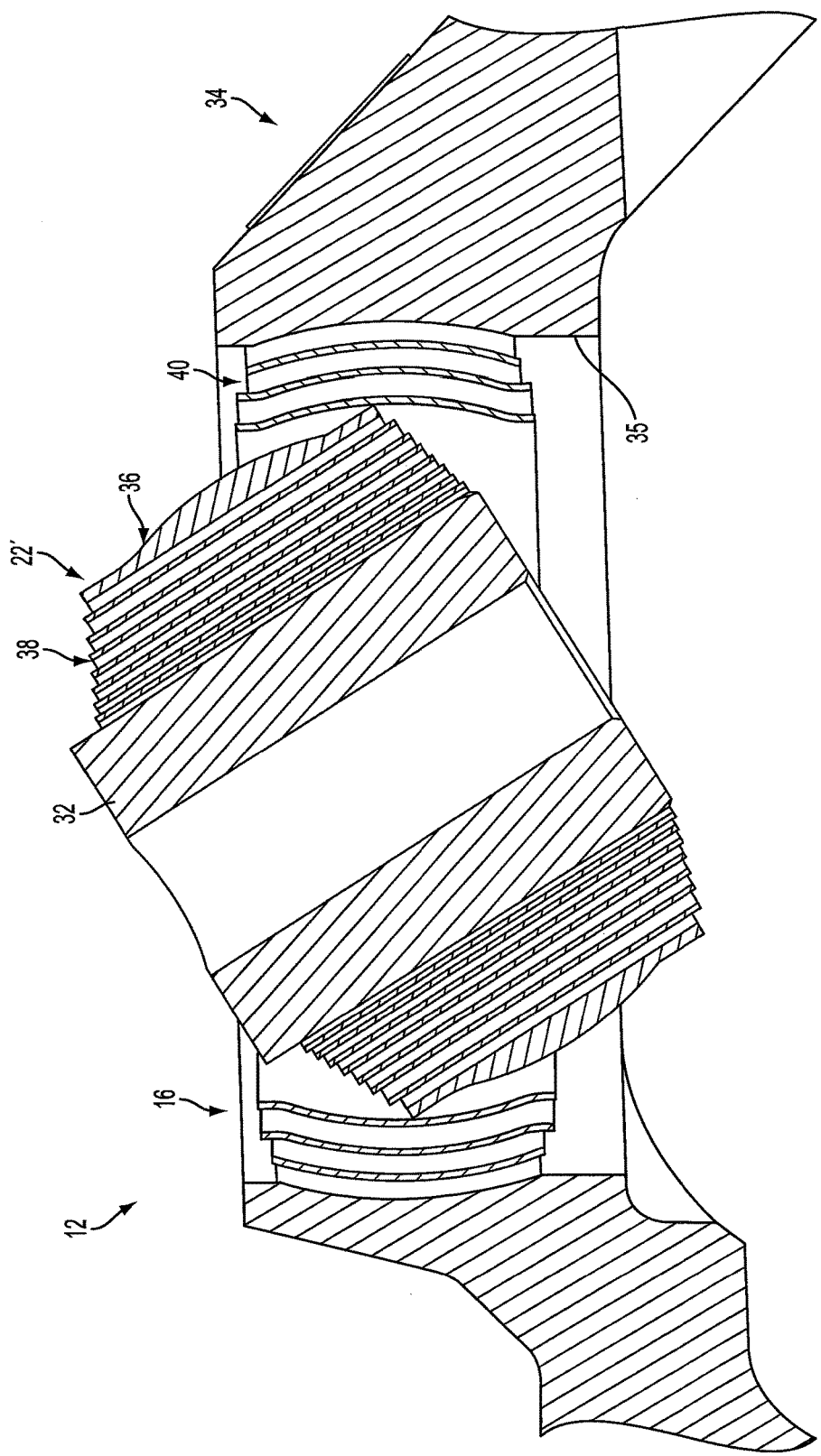
FIG. 10 is an axial cross-sectional view of a laminated elastomeric bearing, depicting a process of installing a bearing inner subassembly within a bearing outer subassembly.

In a presently favored method of assembling the preferred bearing body 16, the bearing body inner and outer subassemblies 38, 40 are separately formed. The inner subassembly 38 is installed within the transition shim 36, the collar 32 is installed within the inner subassembly 38 and the outer subassembly 40 is installed within the housing 34. The inner subassembly 38 and the transition shim 36 are then installed within the outer assembly 40, which requires pivoting or cocking of the transition shim 36 to follow the concave curvature of the adjacent outer elastomeric shim 48, as depicted in FIG. 10. Due to this installation process, the conductive members 14 are preferably coupled with the transition shim 36 after installation of the bearing inner subassembly 38 within the outer subassembly 40. However, the conductive member(s) 14 may alternatively be integrally formed with the transition shim 36 (see FIG. 9) if another method of assembling the plurality of elastomeric and metallic laminae 20, 22 is utilized.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

I claim:
1. A bearing assembly for supporting a pivotable member, the bearing assembly comprising:
    a laminated bearing including a generally cylindrical body having a centerline and a central bore for receiving at least a portion of the pivotable member, the body being formed of a plurality of alternating, generally tubular elastomeric and metallic laminae nested coaxially about the central axis such that the body is substantially solid, each one of the elastomeric and metallic laminae having opposing axial ends; and at least one thermally conductive member formed separately from the laminated bearing body and having an inner axial end attached directly to one of the two axial ends of one of the metallic laminae and an opposing, outer axial end spaced axially from the laminated bearing body such that the conductive member is disposed entirely externally of the laminated body to provide a heat sink for heat to flow generally axially from the coupled metallic laminae into the conductive member;

wherein the at least one conductive member includes one of a generally cylindrical body and a generally arcuate body and has opposing inner and outer circumferential surfaces, each circumferential surface being exposed to ambient air to enable convective heat transfer from the conductive member.

2. The bearing assembly as recited in claim 1 wherein the inner axial end of the conductive member is attached to the one metallic lamina by one of a press-fit, threading, welding, brazing, adhesive, rivets and threaded fasteners.

3. The bearing assembly as recited in claim 1 wherein the one metallic lamina has a generally cylindrical shoulder extending axially from the one axial end and the conductive member has a generally cylindrical shoulder extending axially from the inner axial end, the conductive member shoulder being disposeable against the shoulder of the one metallic lamina.

4. The bearing as recited in claim 1 wherein the at least one conductive member is a first conductive member coupled with a first one of the axial ends of the one metallic lamina and the bearing assembly further comprises at least one second conductive member coupled with a second one of the axial ends of the one metallic lamina.

5. The bearing assembly as recited in claim 1 further comprising at least one sensor mounted to the conductive member.

6. The bearing assembly as recited in claim 5 wherein the sensor is configured to determine at least one of temperature, vibration, acceleration and proximity.

7. The bearing assembly as recited in claim 1 wherein each one of the elastomeric and metallic laminae has an outside diameter, the plurality of laminae being arranged such that each one of the laminae is disposed within all of the other laminae having an outside diameter greater than the outside diameter of the one lamina.

8. The bearing assembly as recited in claim 1 wherein each one of the metallic laminae includes one of a generally cylindrical shell and a plurality of arcuate shells spaced circumferentially about the axis.

9. The bearing assembly as recited in claim 1 wherein the plurality of metallic laminae includes an inner set of substantially circular cylindrical laminae, an outer set of partially spherical laminae disposed about the inner set of cylindrical metallic laminae, and a transition lamina disposed between the inner set of laminae and the outer set of laminae, the transition lamina having a substantially circular cylindrical inner circumferential surface and an at least partly spherical outer circumferential surface, the at least one conductive member being attached to the transition lamina.

10. The bearing assembly as recited in claim 1 wherein the bearing body is configured to permit angular displacement of the pivotable member about the bearing centerline and about at least one axis perpendicular to the bearing centerline.

11. The bearing assembly as recited in claim 1 further comprising:

a generally cylindrical collar disposed within the elastomeric and metallic laminae and having a central passage providing the bearing bore for receiving the pivotable member; and a housing with a bore, the bearing body being disposed within the housing bore.

12. A bearing assembly for supporting a pivotable member, the bearing assembly comprising:

a laminated bearing including a generally cylindrical body having a central bore and being formed of a plurality of alternating, generally tubular elastomeric and metallic laminae nested coaxially about the central axis, each one of the elastomeric and metallic laminae having opposing axial ends, the plurality of metallic laminae including an inner set of substantially cylindrical laminae, an outer set of partially spherical laminae disposed about the inner set of cylindrical metallic laminae, and a transition metallic lamina disposed between the inner set of laminae and the outer set of laminae, the transition lamina having a substantially cylindrical inner circumferential surface and an at least partially spherical outer circumferential surface; and at least one thermally conductive member formed separately from the laminated bearing body and having an inner axial end attached directly to one of the two axial ends of the transition lamina and an opposing, outer axial end spaced axially from the laminated bearing body such that the conductive member is disposed entirely externally of the laminated body to provide a heat sink;

wherein the at least one conductive member includes one of a generally cylindrical body and a generally arcuate body and has opposing inner and outer circumferential surfaces, each circumferential surface being exposed to ambient air to enable convective heat transfer from the conductive member.

13. A feathering hinge for a rotor assembly, the rotor assembly including at least one blade, the hinge assembly comprising:

a generally cylindrical centering pin coupleable with the at least one rotor blade;

a laminated bearing including a generally cylindrical body having a centerline and a central bore for receiving at least a portion of the pin, the body being formed of a plurality of alternating, generally tubular elastomeric and metallic laminae nested coaxially about the central axis such that the body is substantially solid, each one of the elastomeric and metallic laminae having opposing axial ends; and at least one thermally conductive member formed separately from the laminated bearing body and having an inner axial end attached directly to one of the two axial ends of one of the metallic laminae and an opposing, outer axial end spaced axially from the laminated bearing body such that the conductive member is disposed entirely externally of the laminated body to provide a heat sink for heat to flow generally axially from the coupled metallic laminae into the conductive member;

wherein the at least one conductive member includes one of a generally cylindrical body and a generally arcuate body and has opposing inner and outer circumferential surfaces, each circumferential surface being exposed to ambient air to enable convective heat transfer from the conductive member.

* * * * *